United States Patent

Smith

(10) Patent No.: US 9,537,333 B2
(45) Date of Patent: Jan. 3, 2017

(54) VOLTAGE SUPPLY SYSTEM AND METHOD FOR DISABLING OPERATION OF A DC-DC VOLTAGE CONVERTER

(71) Applicant: LG Chem, Ltd., Seoul (KR)

(72) Inventor: Alexander Jeffrey Smith, White Lake, MI (US)

(73) Assignee: LG Chem, Ltd., Seoul (KR)

( * ) Notice: Subject to any disclaimer, the term of this patent is extended or adjusted under 35 U.S.C. 154(b) by 210 days.

(21) Appl. No.: 14/258,113

(22) Filed: Apr. 22, 2014

(65) Prior Publication Data

US 2015/0303720 A1 Oct. 22, 2015

(51) Int. Cl.
*H02J 7/00* (2006.01)

(52) U.S. Cl.
CPC ........ *H02J 7/0031* (2013.01); *H02J 2007/004* (2013.01)

(58) Field of Classification Search
CPC .............. H02J 7/0031; H02J 2007/0037; H02J 2007/004; H02J 2007/0054; H02H 7/18; H02H 7/0031; H02H 2007/004; H02H 2007/70054
USPC ............................................ 361/18; 320/134
See application file for complete search history.

(56) References Cited

U.S. PATENT DOCUMENTS

| 5,408,842 A | 4/1995 | Goto et al. |
| 6,438,044 B2 | 8/2002 | Fukuda |
| 6,654,262 B2 | 11/2003 | Hussein et al. |
| 6,768,621 B2 | 7/2004 | Arnet et al. |
| 7,400,116 B2 | 7/2008 | Kato et al. |
| 7,688,023 B2 | 3/2010 | Yoon et al. |
| 8,456,878 B2 | 6/2013 | Min |
| 2003/0029654 A1 | 2/2003 | Shimane et al. |

(Continued)

FOREIGN PATENT DOCUMENTS

| JP | 767214 A | 3/1995 |
| JP | 07067214 A | 3/1995 |

(Continued)

OTHER PUBLICATIONS

U.S. Appl. No. 14/105,219, filed Dec. 13, 2013 entitled Pre-Charging System for a Capacitor in a Voltage Inverter for an Electric Motor.

(Continued)

*Primary Examiner* — Ann Hoang
(74) *Attorney, Agent, or Firm* — Buckert Patent & Trademark Law Firm, PC; John F. Buckert

(57) ABSTRACT

A voltage supply system having a first battery with a first anode and a first cathode, and a contactor coupled in series between the first anode and an electrical node is provided. The system includes a first voltage sensor generating a signal indicative of a first voltage level of the first battery, and a second voltage sensor generating a signal indicative of a second voltage level between the electrical node and the first cathode. The system includes a DC-DC voltage converter coupled between the electrical node and the first cathode; and a second battery, and a microprocessor. The microprocessor disables operation of the DC-DC voltage converter such that the converter does not apply a voltage to the second battery, if both the first voltage level is substantially equal to the second voltage level, and the first voltage level is less than a first threshold voltage level.

13 Claims, 3 Drawing Sheets

(56) References Cited

U.S. PATENT DOCUMENTS

| | | |
|---|---|---|
| 2005/0219195 A1 | 10/2005 | Yano et al. |
| 2006/0076934 A1 | 4/2006 | Ogata et al. |
| 2007/0264547 A1 | 11/2007 | Ojima et al. |
| 2010/0225258 A1 | 9/2010 | Namuduri et al. |
| 2010/0277845 A1 | 11/2010 | Park et al. |
| 2011/0049977 A1 | 3/2011 | Onnerud et al. |
| 2013/0229186 A1* | 9/2013 | Shiraishi .............. G01R 31/327 |
| | | 324/415 |
| 2013/0278055 A1 | 10/2013 | Herbig et al. |
| 2014/0001835 A1 | 1/2014 | Basheer |
| 2015/0084404 A1 | 3/2015 | Hashim et al. |

FOREIGN PATENT DOCUMENTS

| | | |
|---|---|---|
| JP | 09284912 A | 10/1997 |
| JP | 200361209 | 2/2003 |
| JP | 2006136161 A | 5/2006 |
| JP | 2007305372 A | 11/2007 |
| KR | 1020090075910 | 7/2009 |
| KR | 20100104079 A | 9/2010 |
| KR | 1020130022763 A | 3/2013 |
| KR | 20140040701 | 4/2014 |

OTHER PUBLICATIONS

U.S. Appl. No. 14/135,899, filed Dec. 20, 2013 entitled Pre-Charging System for a Capacitor in an Electric Motor Voltage Inverter.

U.S. Appl. No. 14/221,316, filed Mar. 21, 2014 entitled Pre-Charging and Voltage Supply System for a DC-AC Inverter.

* cited by examiner

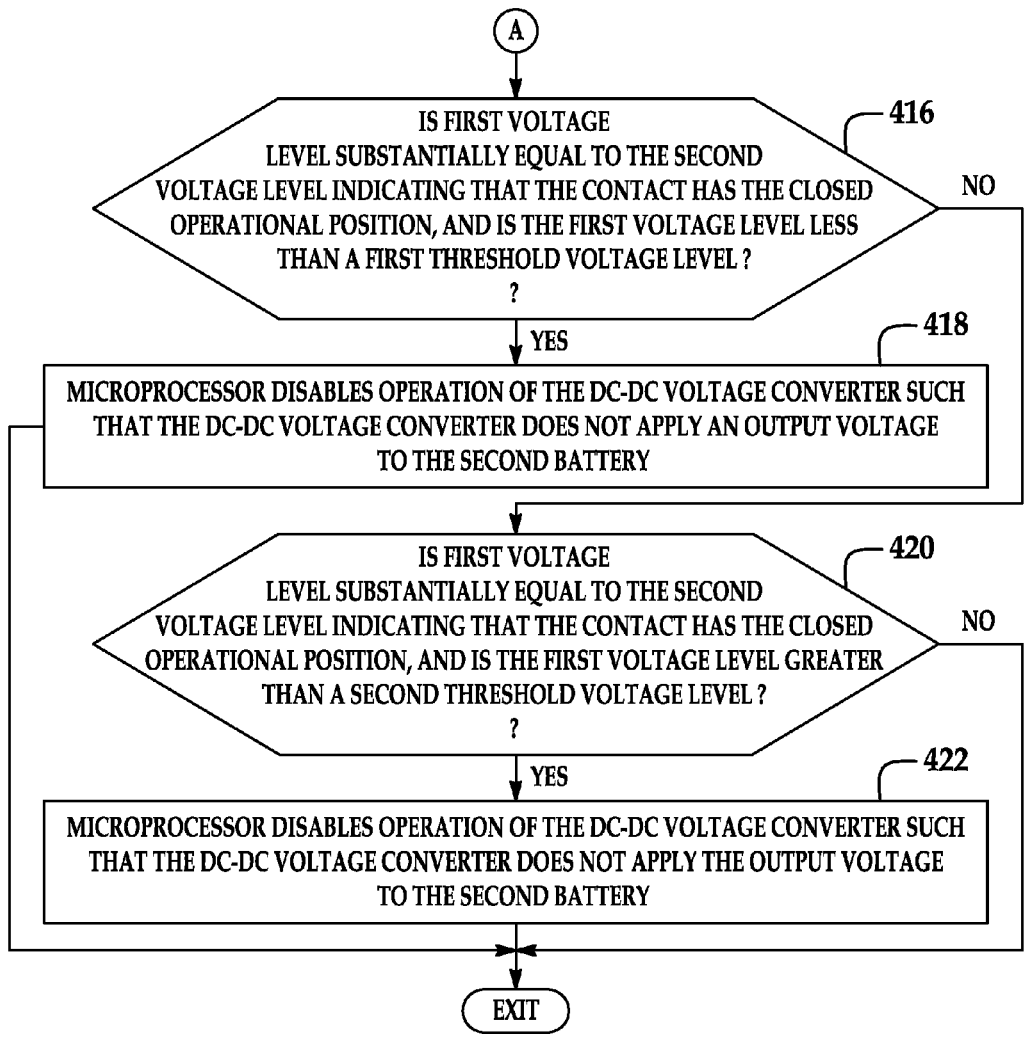

VOLTAGE SUPPLY SYSTEM AND METHOD FOR DISABLING OPERATION OF A DC-DC VOLTAGE CONVERTER

BACKGROUND

The inventor herein has recognized a need for an improved voltage supply system and a method for disabling operation of a DC-DC voltage converter that reduces a possibility that a battery will be completely discharged in the event of a contactor fault condition.

SUMMARY

A voltage supply system in accordance with an exemplary embodiment is provided. The voltage supply system includes a first battery having a first anode and a first cathode. The first battery is adapted to generate a first voltage level between the first anode and the first cathode. The voltage supply system further includes a contactor electrically coupled in series with and between the first anode and an electrical node. The voltage supply system further includes a first voltage sensor electrically coupled in parallel with the first battery. The first voltage sensor is adapted to generate a first voltage signal indicative of the first voltage level. The voltage supply system further includes a second voltage sensor electrically coupled between and to the electrical node and the first cathode of the first battery. The second voltage sensor is adapted to generate a second voltage signal indicative of a second voltage level between the electrical node and the first cathode. The voltage supply system further includes a DC-DC voltage converter electrically coupled between and to the electrical node and the first cathode. The voltage supply system further includes a second battery having a second anode and a second cathode. The second anode is electrically coupled to the DC-DC voltage converter. The second battery is adapted to generate a third voltage level between the second anode and the second cathode. The third voltage level is less than the first voltage level. The voltage supply system further includes a microprocessor operably coupled to the first voltage sensor, the second voltage sensor, the contactor, and the DC-DC voltage converter. The microprocessor is programmed to stop generating a first control signal to attempt to induce the contactor to transition a contact from a closed operational position to an open operational position. The microprocessor is further programmed to disable operation of the DC-DC voltage converter such that the DC-DC voltage converter does not apply an output voltage to the second battery, if both the first voltage level is substantially equal to the second voltage level indicating that the contact has the closed operational position, and the first voltage level is less than a first threshold voltage level.

A method for disabling operation of a DC-DC voltage converter during a voltage supply system fault condition in accordance with another exemplary embodiment is provided. The method includes providing a voltage supply system having a first battery, a second battery, a contactor, a first voltage sensor, a second voltage sensor, a DC-DC voltage converter, and a microprocessor. The first battery has a first anode and a first cathode. The first battery is adapted to generate a first voltage level between the first anode and the first cathode. The contactor is electrically coupled in series with and between the first anode and an electrical node. The first voltage sensor is electrically coupled in parallel with the first battery. The second voltage sensor is electrically coupled between and to the electrical node and the first cathode. The DC-DC voltage converter is electrically coupled between and to the electrical node and the first cathode. The second battery has a second anode and a second cathode. The second anode is electrically coupled to the DC-DC voltage converter. The microprocessor is operably coupled to the first voltage sensor, the second voltage sensor, the contactor, and the DC-DC voltage converter. The method includes stopping a generation of a first control signal by the microprocessor to attempt to induce the contactor to transition a contact from a closed operational position to an open operational position. The method further includes generating a first voltage signal indicative of the first voltage level of the first battery utilizing the first voltage sensor. The method further includes generating a second voltage signal indicative of a second voltage level between the electrical node and the first cathode utilizing the second voltage sensor. The method further includes disabling operation of the DC-DC voltage converter by the microprocessor such that the DC-DC voltage converter does not apply an output voltage to the second battery, if both the first voltage level is substantially equal to the second voltage level indicating that the contact has the closed operational position, and the first voltage level is less than a first threshold voltage level.

BRIEF DESCRIPTION OF THE DRAWINGS

FIGS. 2-5 are flowcharts of a method for disabling operation of a DC-DC voltage converter during a voltage supply system fault condition in accordance with another exemplary embodiment.

DETAILED DESCRIPTION

Figure 1:
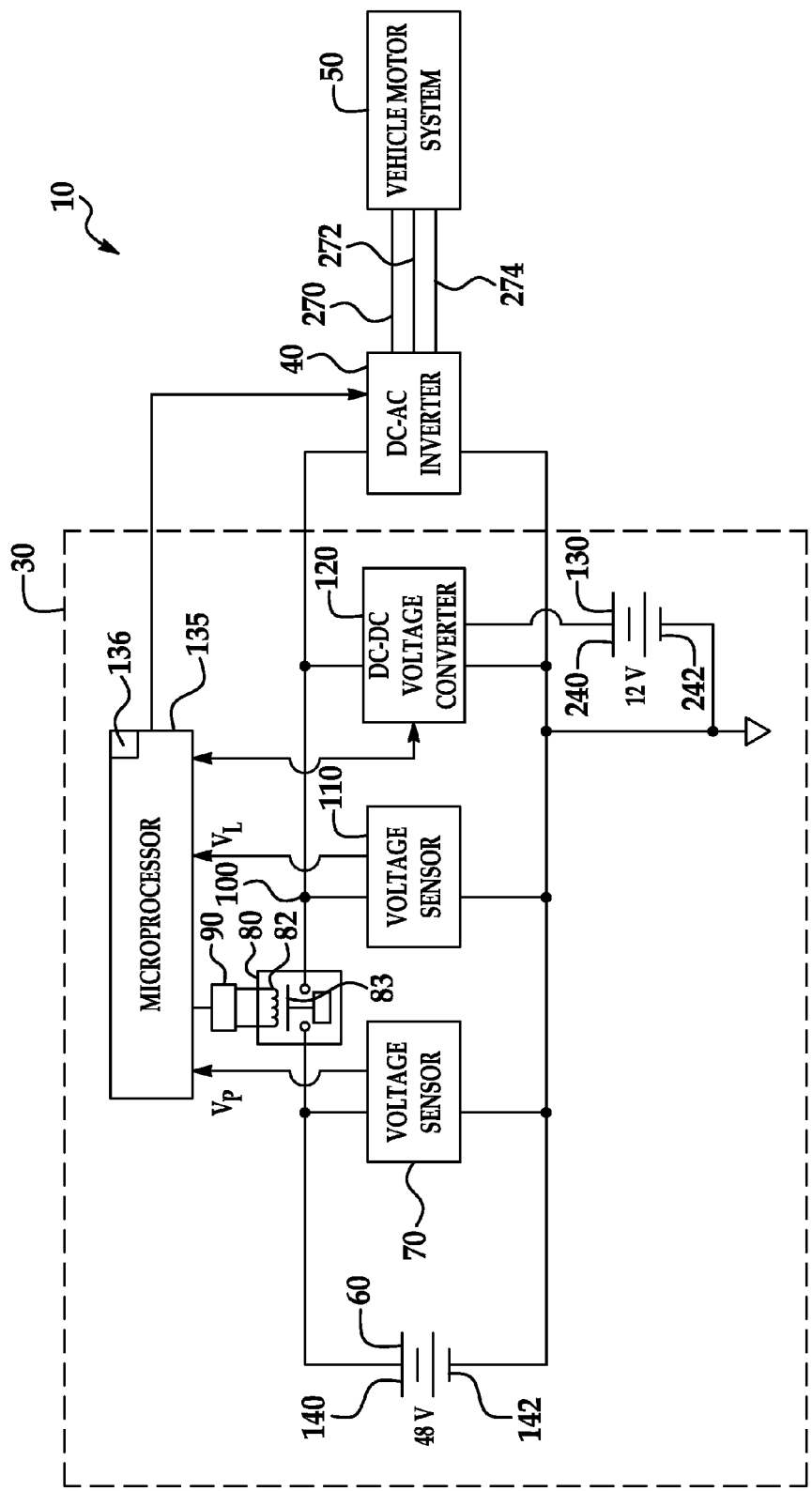
FIG. 1 is a schematic of an electric vehicle having a voltage supply system in accordance with an exemplary embodiment, a DC-AC inverter, and a vehicle motor system.
Figure 2:
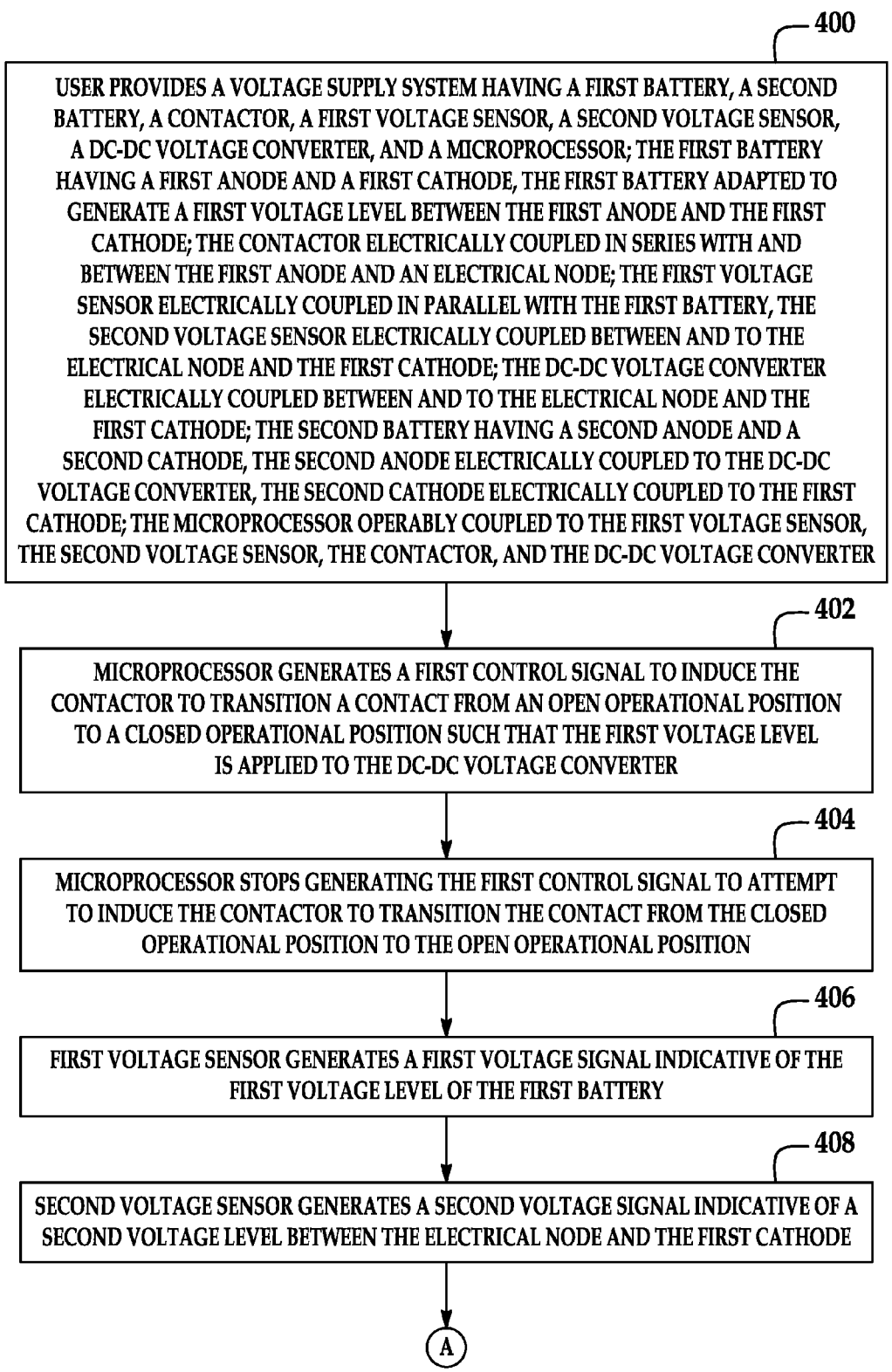

Referring to FIG. 1, an electric vehicle 10 having a voltage supply system 30 in accordance with an exemplary embodiment, a DC-AC inverter 40, and a vehicle motor system 50 is illustrated. An advantage of the voltage supply system 30 is that the system 30 can disable operation of a DC-DC voltage converter 120 such that the DC-DC voltage converter 120 stops applying an output voltage to a second battery 130, when a contactor 80 is stuck in a closed operational position, to prevent a first battery 60 from being completely discharged.

The voltage supply system 30 is provided to supply operational voltage to the DC-AC inverter 40. The voltage supply system 30 is further provided to disable operation of the DC-DC voltage converter 120 such that the DC-DC voltage converter 120 stops applying an output voltage to the battery 130, when the contactor 80 is stuck in the closed operational position, to prevent the first battery 60 from being completely discharged.

The voltage supply system 30 includes the first battery 60, a first voltage sensor 70, the contactor 80, a contactor driver 90, an electrical node 100, a second voltage sensor 110, the DC-DC voltage converter 120, and the second battery 130.

The first battery 60 has an anode 140 and a cathode 142. The first battery 60 is adapted to generate a first voltage level between the anode 140 and the cathode 142. In an exemplary embodiment, the first battery 60 comprises a lithium-ion battery pack having a plurality of battery cells electrically coupled together therein. Of course, in an alternative embodiment the first battery 60 could comprise another type of battery such as a nickel-cadmium battery a nickel-metal-hydride battery, or a lead acid battery for example. Further, in an exemplary embodiment, the first battery 60 outputs substantially 48 volts DC (VDC). Of course, in an alternative embodiment, the first battery 60 could output another voltage level. For example, the first battery 60 could output a voltage in a range of 300-400 VDC, or in a range greater than 400 VDC.

The first voltage sensor 70 is the electrically coupled in parallel with the first battery 60, and further electrically coupled to the anode 140 and the cathode 142 of the first battery 60. The first voltage sensor 70 is adapted to generate a voltage signal ($V_P$) indicative of a voltage level output by the first battery 60. The microprocessor 135 receives the voltage signal ($V_P$) from the first voltage sensor 70 and determines the voltage level output by the first battery 60 based on the voltage signal ($V_P$).

The contactor 80 is electrically coupled in series with and between the first anode 60 and the electrical node 100. The contactor 80 includes a contactor coil 82 and a contact 83. When the microprocessor 135 generates a control signal that is received by the contactor driver 90, the contactor driver 90 energizes the contactor coil 82 which moves the contact 83 to a closed operational position. Alternately, when the microprocessor 135 stops generating the control signal, the contactor driver 90 de-energizes the contactor coil 82 which moves the contact 83 to an open operational position, when the contactor 80 is operating as desired and has a non-fault operational condition. If the contactor 80 is not operating as desired and has a fault operational condition, the contact 83 may undesirably remain in a closed operational position, when the microprocessor 135 stops generating the control signal and the contactor driver 90 de-energizes the contactor coil 82.

The second voltage sensor 110 is electrically coupled between and to the electrical node 100 and the cathode 142. The second voltage sensor 110 is adapted to generate a voltage signal ($V_L$) indicative of a voltage level between the electrical node 100 and the cathode 142. The microprocessor 135 receives the voltage signal ($V_L$) from the second voltage sensor 110 and determines the voltage level between the electrical node 100 and the cathode 142 based on the voltage signal ($V_L$).

The second battery 130 has an anode 240 and a cathode 242. The anode 240 is electrically coupled to the DC-DC voltage converter 120. In an exemplary embodiment, the cathode 242 is electrically coupled to the cathode 142 such that the cathode 242 and the cathode 142 have a common electrical ground. In an alternative embodiment, the cathode 242 is not electrically coupled to the cathode 142 such that the cathode 242 and the cathode 142 do not have a common electrical ground. The second battery 130 is adapted to generate a voltage level between the anode 240 and the cathode 242 which is less than a voltage level output by the first battery 60. In an exemplary embodiment, the second battery 130 is a lead acid battery. Of course, in an alternative embodiment the second battery 130 could comprise another type of battery such as a nickel-cadmium battery, a nickel-metal-hydride battery, or a lithium-ion battery for example. Further, in an exemplary embodiment, the second battery 130 outputs substantially 12 VDC. Of course, in an alternative embodiment, the second battery 130 could output another voltage level.

The DC-DC voltage converter 120 is electrically coupled between and to the electrical node 100 and the cathode 142. The DC-DC voltage converter 120 is further electrically coupled to the anode 240 of the second battery 130. The DC-DC voltage converter 120 is provided to apply an output voltage between the anode 240 and the cathode 242 of the second battery 130 to charge the second battery 130.

In an exemplary embodiment, during operation, the microprocessor 135 generates a control signal that is received by the DC-DC voltage converter 120, and in response the DC-DC voltage converter 120 applies an output voltage between the anode 240 and the cathode 242 of the second battery 130 to charge the second battery 130. Further, if the microprocessor 135 determines that the contact 83 is stuck in a closed operational position, the microprocessor 135 stops generating the control signal which induces the DC-DC voltage converter 120 to be disabled such that the DC-DC voltage converter 120 stops applying the output voltage between the anode 240 and the cathode 242 of the second battery 130.

In another exemplary embodiment, during operation, the microprocessor 135 generates a command message having an enable command that is received by the DC-DC voltage converter 120, and in response the DC-DC voltage converter 120 applies an output voltage between the anode 240 and the cathode 242 of the second battery 130 to charge the second battery 130. Further, if the microprocessor 135 determines that the contact 83 is stuck in a closed operational position, the microprocessor 135 generates a command message having a disable command that is received by the DC-DC voltage converter 120, and in response, the DC-DC voltage converter 120 is disabled such that the DC-DC voltage converter 120 stops applying the output voltage between the anode 240 and the cathode 242 of the battery.

The DC-AC inverter 40 is electrically coupled between and to the electrical node 100 and the cathode 142. Further, the DC-AC inverter 40 is electrically coupled to the vehicle motor system 50 via the electrical lines 270, 272, 274. Still further, the DC-AC inverter 40 operably communicates with the microprocessor 135. When the contact 83 has the closed operational position, the DC-AC inverter 40 receives a voltage level from the first battery 60. Further, the microprocessor 135 may generate a control signal to induce the DC-AC inverter to output AC voltages on the electrical lines 270, 272, 274 to induce the vehicle motor system 50 to output a desired torque amount.

The microprocessor 135 is operably coupled to the first voltage sensor 70, the second voltage sensor 110, the DC-DC voltage converter 120, and the DC-AC inverter 40. The microprocessor 135 operably communicates with a memory device 136 and stores data and operational instructions in the memory device 136. The microprocessor 135 is programmed to perform operational steps which will be described in greater detail below.

Referring to FIGS. 1-5, a flowchart of a method for disabling operation of the DC-DC voltage converter 120 during a voltage supply system fault condition in accordance with another exemplary embodiment will now be described.

At step 400, a user provides the voltage supply system 30 having the first battery 60, the second battery 130, the contactor 80, the first voltage sensor 70, the second voltage sensor 110, the DC-DC voltage converter 120, and the microprocessor 135. The first battery 60 has the anode 140 and the cathode 142. The first battery 60 is adapted to generate a first voltage level between the anode 140 and the cathode 142. The contactor 80 is electrically coupled in series with and between the anode 140 and an electrical node 100. The first voltage sensor 70 is electrically coupled in parallel with the first battery 60. The second voltage sensor 110 is electrically coupled between and to the electrical node 100 and the cathode 142. The DC-DC voltage converter 120 is electrically coupled between and to the electrical node 100 and the cathode 142. The second battery 130 has the anode 240 and the cathode 242. The anode 240 is electrically coupled to the DC-DC voltage converter 120. The cathode 242 is electrically coupled to the cathode 142. The microprocessor 135 is operably coupled to the first voltage sensor 70, the second voltage sensor 110, the contactor 80, and the DC-DC voltage converter 120. After step 400, the method advances to step 402.

At step 402, the microprocessor 135 generates a first control signal to induce the contactor 80 to transition the contact 83 from an open operational position to a closed operational position such that the first voltage level is applied to the DC-DC voltage converter 120. After step 402, the method advances to step 404.

At step 404, the microprocessor 135 stops generating the first control signal to attempt to induce the contactor 80 to transition the contact 83 from the closed operational position to the open operational position. After step 404, the method advances to step 406.

At step 406, the first voltage sensor 70 generates a first voltage signal indicative of the first voltage level of the first battery 60. After step 406, the method advances to step 408.

At step 408, the second voltage sensor 110 generates a second voltage signal indicative of a second voltage level between the electrical node 100 and the cathode 142. After step 408, the method advances to step 416.

At step 416, the microprocessor 136 makes a determination as to whether the first voltage level is substantially equal to the second voltage level indicating that the contact 83 has the closed operational position, and whether the first voltage level is less than a first threshold voltage level. If the value of step 416 equals "yes", the method advances to step 418. Otherwise, the method advances to step 420.

At step 418, the microprocessor 135 disables operation of the DC-DC voltage converter 120 such that the DC-DC voltage converter 120 does not apply an output voltage to the second battery 130. After step 418, the method is exited.

Referring again to step 416, if the value of step 416 equals "no", the method advances to step 420. At step 420, the microprocessor 135 makes a determination as to whether the first voltage level is substantially equal to the second voltage level indicating that the contact 83 has the closed operational position, and whether the first voltage level is greater than a second threshold voltage level. If the value step 420 equals "yes", the method advances to step 422. Otherwise, the method is exited.

At step 422, the microprocessor 135 disables operation of the DC-DC voltage converter 120 such that the DC-DC voltage converter 120 does not apply the output voltage to the second battery 130. After step 422, method is exited.

In an exemplary embodiment, the step 418 is implemented by the step 500. At step 500, the microprocessor 135 stops generating a second control signal which induces the DC-DC voltage converter 120 to be disabled such that the DC-DC voltage converter 120 does not apply the output voltage to the second battery 130. In another exemplary embodiment, the step 418 is implemented by the step 502. At step 502, the microprocessor 135 generates a command message having a disable command that is received by the DC-DC voltage converter 120 such that the DC-DC voltage converter 120 is disabled in response to the disable command.

The above-described method can be at least partially embodied in the form of one or more memory devices or computer readable media having computer-executable instructions for practicing the methods. The memory devices can comprise one or more of the following: hard drives, RAM memory, flash memory, and other computer-readable media known to those skilled in the art; wherein, when the computer-executable instructions are loaded into and executed by one or more computers or microprocessors, the one or more computers or microprocessors become an apparatus programmed to practice the associated steps of the method.

The voltage supply system and the method described herein provide a substantial advantage over other systems and methods. In particular, the voltage supply system and the method provide a technical effect of disabling operation of a DC-DC voltage converter such that the DC-DC voltage converter stops applying an output voltage to a second battery, when a contactor is undesirably stuck in a closed operational position, to prevent a first battery from being completely discharged.

While the claimed invention has been described in detail in connection with only a limited number of embodiments, it should be readily understood that the invention is not limited to such disclosed embodiments. Rather, the claimed invention can be modified to incorporate any number of variations, alterations, substitutions or equivalent arrangements not heretofore described, but which are commensurate with the spirit and scope of the invention. Additionally, while various embodiments of the claimed invention have been described, it is to be understood that aspects of the invention may include only some of the described embodiments. Accordingly, the claimed invention is not to be seen as limited by the foregoing description.

What is claimed is:

1. A voltage supply system, comprising:
   a first battery having a first anode and a first cathode, the first battery adapted to generate a first voltage level between the first anode and the first cathode;
   a contactor electrically coupled in series with and between the first anode and an electrical node;
   a first voltage sensor electrically coupled in parallel with the first battery, the first voltage sensor adapted to generate a first voltage signal indicative of the first voltage level;
   a second voltage sensor electrically coupled between and to the electrical node and the first cathode of the first battery, the second voltage sensor adapted to generate a second voltage signal indicative of a second voltage level between the electrical node and the first cathode;
   a DC-DC voltage converter electrically coupled between and to the electrical node and the first cathode of the battery;
   a second battery having a second anode and a second cathode, the second anode electrically coupled to the DC-DC voltage converter, the second cathode of the second battery being electrically coupled to both the first cathode of the first battery and the DC-DC voltage converter, the second battery adapted to generate a third voltage level between the second anode and the second cathode, the third voltage level being less than the first voltage level;
   a microprocessor operably coupled to the first voltage sensor, the second voltage sensor, the contactor, and the DC-DC voltage converter;
   the microprocessor being programmed to stop generating a first control signal to attempt to induce the contactor to transition a contact from a closed operational position to an open operational position; and
   the microprocessor being further programmed to disable operation of the DC-DC voltage converter such that the DC-DC voltage converter does not apply an output voltage to the second battery, if both the first voltage level is substantially equal to the second voltage level indicating that the contact has the closed operational position, and the first voltage level is less than a first threshold voltage level.

2. The voltage supply system of claim 1, wherein the microprocessor being further programmed to disable operation of the DC-DC voltage converter such that the DC-DC voltage converter does not apply the output voltage to the second battery, if both the first voltage level is substantially equal to the second voltage level indicating that the contact has the closed operational position, and the first voltage level is greater than a second threshold voltage level; the second threshold voltage level being greater than the first threshold voltage level.

3. The voltage supply system of claim 1, wherein the microprocessor being further programmed to disable operation of the DC-DC voltage converter comprises:
the microprocessor being programmed to stop generating a second control signal which induces the DC-DC voltage converter to be disabled such that the DC-DC voltage converter does not apply the output voltage to the second battery.

4. The voltage supply system of claim 1, wherein the microprocessor being further programmed to disable operation of the DC-DC voltage converter comprises:
the microprocessor being programmed to generate a command message having a disable command that is received by the DC-DC voltage converter, the DC-DC voltage converter being disabled in response to the disable command.

5. The voltage supply system of claim 1, wherein the first voltage level is substantially equal to 48 VDC, and the second voltage level is substantially equal to 12 VDC.

6. The voltage supply system of claim 1, wherein the second cathode of the second battery, the first cathode of the first battery, and the DC-DC voltage converter are electrically coupled directly to a common ground.

7. A method for disabling operation of a DC-DC voltage converter during a voltage supply system fault condition, comprising:
providing a voltage supply system having a first battery, a second battery, a contactor, a first voltage sensor, a second voltage sensor, a DC-DC voltage converter, and a microprocessor; the first battery having a first anode and a first cathode, the first battery adapted to generate a first voltage level between the first anode and the first cathode; the contactor electrically coupled in series with and between the first anode and an electrical node; the first voltage sensor electrically coupled in parallel with the first battery, the second voltage sensor electrically coupled between and to the electrical node and the first cathode; the DC-DC voltage converter electrically coupled between and to the electrical node and the first cathode of the first battery; the second battery having a second anode and a second cathode, the second anode electrically coupled to the DC-DC voltage converter; the second cathode of the second battery being electrically coupled to both the first cathode of the first battery and the DC-DC voltage converter; the microprocessor operably coupled to the first voltage sensor, the second voltage sensor, the contactor, and the DC-DC voltage converter;
stopping a generation of a first control signal by the microprocessor to attempt to induce the contactor to transition a contact from a closed operational position to an open operational position;
generating a first voltage signal indicative of the first voltage level of the first battery utilizing the first voltage sensor;
generating a second voltage signal indicative of a second voltage level between the electrical node and the first cathode utilizing the second voltage sensor; and
disabling operation of the DC-DC voltage converter by the microprocessor such that the DC-DC voltage converter does not apply an output voltage to the second battery, if both the first voltage level is substantially equal to the second voltage level indicating that the contact has the closed operational position, and the first voltage level is less than a first threshold voltage level.

8. The method of claim 7, further comprising:
disabling operation of the DC-DC voltage converter by the microprocessor such that the DC-DC voltage converter does not apply the output voltage to the second battery, if both the first voltage level is substantially equal to the second voltage level indicating that the contact has the closed operational position, and the first voltage level is greater than a second threshold voltage level; the second threshold voltage level being greater than the first threshold voltage level.

9. The method of claim 7, wherein disabling operation of the DC-DC voltage converter by the microprocessor comprises stopping a generation of a second control signal by the microprocessor which induces the DC-DC voltage converter to be disabled such that the DC-DC voltage converter does not apply the output voltage to the second battery.

10. The method of claim 7, wherein disabling operation of the DC-DC voltage converter by the microprocessor comprises generating a command message having a disable command by the microprocessor that is received by the DC-DC voltage converter, the DC-DC voltage converter being disabled in response to the disable command.

11. The method of claim 7, wherein the first voltage level is substantially equal to 48 VDC, and the second voltage level is substantially equal to 12 VDC.

12. The method of claim 7, wherein the second cathode of the second battery, the first cathode of the first battery, and the DC-DC voltage converter are electrically coupled directly to a common ground.

13. A voltage supply system, comprising:
a first battery having a first anode and a first cathode, the first battery adapted to generate a first voltage level between the first anode and the first cathode;
a contactor electrically coupled in series with and between the first anode and an electrical node;
a first voltage sensor electrically coupled in parallel with the first battery, the first voltage sensor adapted to generate a first voltage signal indicative of the first voltage level;
a second voltage sensor electrically coupled between and to the electrical node and the first cathode of the first battery, the second voltage sensor adapted to generate a second voltage signal indicative of a second voltage level between the electrical node and the first cathode;
a DC-DC voltage converter electrically coupled between and to the electrical node and the first cathode of the first battery;
a second battery having a second anode and a second cathode, the second anode electrically coupled to the DC-DC voltage converter, the second cathode of the second battery being electrically coupled to both the first cathode of the first battery and the DC-DC voltage converter; the second cathode of the second battery, the first cathode of the first battery, and the DC-DC voltage converter being electrically coupled directly to a common ground; the second battery adapted to generate a third voltage level between the second anode and the second cathode, the third voltage level being less than the first voltage level;

a microprocessor operably coupled to the first voltage sensor, the second voltage sensor, the contactor, and the DC-DC voltage converter;

the microprocessor being programmed to stop generating a first control signal to attempt to induce the contactor to transition a contact from a closed operational position to an open operational position; and the microprocessor being further programmed to disable operation of the DC-DC voltage converter such that the DC-DC voltage converter does not apply an output voltage to the second battery, if both the first voltage level is substantially equal to the second voltage level indicating that the contact has the closed operational position, and the first voltage level is less than a first threshold voltage level; and the microprocessor being further programmed to disable operation of the DC-DC voltage converter such that the DC-DC voltage converter does not apply the output voltage to the second battery, if both the first voltage level is substantially equal to the second voltage level indicating that the contact has the closed operational position, and the first voltage level is greater than a second threshold voltage level; the second threshold voltage level being greater than the first threshold voltage level.

* * * * *